US009023507B2

(12) United States Patent
Yoshitake et al.

(10) Patent No.: US 9,023,507 B2
(45) Date of Patent: May 5, 2015

(54) BATTERY ASSEMBLY AND METHOD OF MANUFACTURING THE SAME

(75) Inventors: Shinsuke Yoshitake, Kyoto (JP); Katsuhiko Okamoto, Kyoto (JP); Jun Nakamura, Kyoto (JP); Takeshi Sasaki, Kyoto (JP)

(73) Assignee: GS Yuasa International, Ltd., Kyoto-Shi Kyoto (JP)

( * ) Notice: Subject to any disclaimer, the term of this patent is extended or adjusted under 35 U.S.C. 154(b) by 612 days.

(21) Appl. No.: 13/375,173

(22) PCT Filed: Jun. 1, 2010

(86) PCT No.: PCT/JP2010/059261
§ 371 (c)(1),
(2), (4) Date: Nov. 29, 2011

(87) PCT Pub. No.: WO2010/140584
PCT Pub. Date: Dec. 9, 2010

(65) Prior Publication Data
US 2012/0077077 A1      Mar. 29, 2012

(30) Foreign Application Priority Data
Jun. 1, 2009  (JP) .................... 2009-132040

(51) Int. Cl.
*H01M 6/46* (2006.01)
*H01M 10/04* (2006.01)
*H01M 2/02* (2006.01)
*H01M 2/10* (2006.01)
*H01M 6/42* (2006.01)

(52) U.S. Cl.
CPC ............. *H01M 10/04* (2013.01); *H01M 2/024* (2013.01); *H01M 2/0245* (2013.01); *H01M 2/0262* (2013.01); *H01M 2/0277* (2013.01); *H01M 2/0285* (2013.01); *H01M 2/1077* (2013.01); *H01M 6/42* (2013.01)

(58) Field of Classification Search
None
See application file for complete search history.

(56) References Cited

U.S. PATENT DOCUMENTS 6,517,966 B1 *  2/2003  Marukawa et al. ........... 429/120
8,057,555 B2   11/2011  Hiratsuka et al.
(Continued)

FOREIGN PATENT DOCUMENTS

| CN | 101382675 A | 3/2009 |
|----|-------------|--------|
| JP | 2002-245992 A | 8/2002 |

(Continued)

OTHER PUBLICATIONS

EN Translation of JP2002334684A.*
(Continued)

*Primary Examiner* — Patrick Ryan
*Assistant Examiner* — Lucas J O Donnell
(74) *Attorney, Agent, or Firm* — McGinn IP Law Group, PLLC

(57) ABSTRACT

Provided is a battery assembly that is lightweight while ensuring sufficient bonding strength that is required between frames, as well as a method of manufacturing the same. The battery assembly includes a plurality of cell units that are integrated together, each of the plurality of cell units including: a cell having a metal case; and a plastic frame that is integrally formed with an outer surface of the case, wherein the cell units are integrated together by having the frames of adjacent ones of the cell units joined together through surfaces thereof.

15 Claims, 3 Drawing Sheets

(56) References Cited

U.S. PATENT DOCUMENTS

| | | | |
|---|---|---|---|
| 2004/0161545 A1* | 8/2004 | Montano et al. | 427/407.1 |
| 2006/0068281 A1 | 3/2006 | Hiratsuka et al. | |
| 2007/0207377 A1* | 9/2007 | Han et al. | 429/162 |
| 2011/0005812 A1* | 1/2011 | Shimokawa et al. | 174/255 |

FOREIGN PATENT DOCUMENTS

| | | |
|---|---|---|
| JP | 2002-334681 A | 11/2002 |
| JP | 2002-334684 A | 11/2002 |
| JP | 2003-240642 A | 8/2003 |
| JP | 2003-272569 A | 9/2003 |
| JP | 2003-323869 A | 11/2003 |
| JP | 2003-346745 A | 12/2003 |
| JP | 2004-281099 A | 10/2004 |
| JP | 2004-362874 A | 12/2004 |
| JP | 2005-189080 A | 7/2005 |
| JP | 2005-339925 A | 12/2005 |
| JP | 2006-286970 A | 10/2006 |
| JP | 2006-310834 A | 11/2006 |
| JP | 2008-16259 A | 1/2008 |
| JP | 2008-21507 A | 1/2008 |
| WO | WO 2004/055924 A1 | 7/2004 |

OTHER PUBLICATIONS

International Search Report (ISR) (PCT Form PCT/ISA/210) dated Sep. 7, 2010.

* cited by examiner

F I G . 2
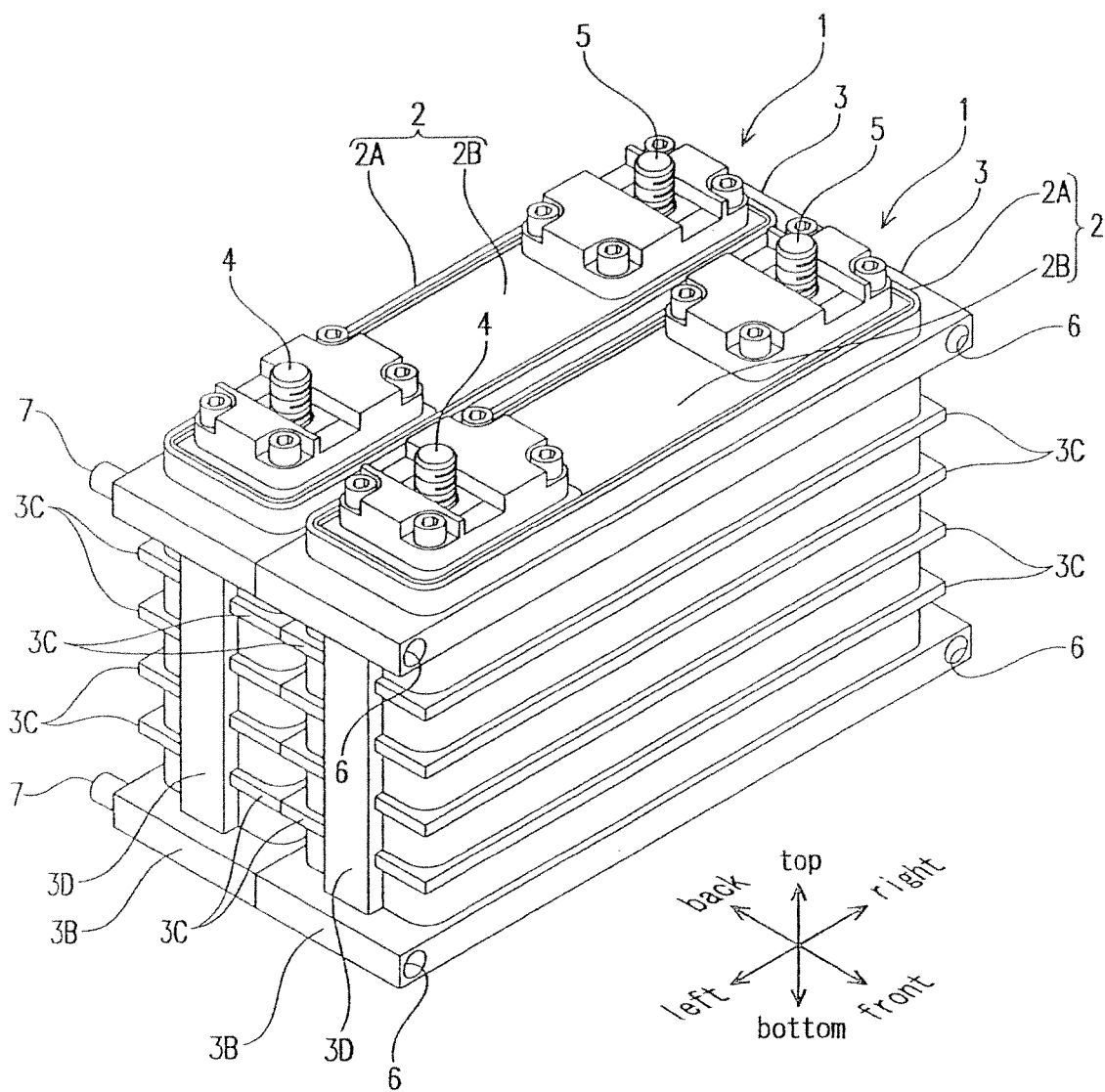

BATTERY ASSEMBLY AND METHOD OF MANUFACTURING THE SAME

TECHNICAL FIELD

The present invention relates to a battery assembly including a plurality of cell units that are integrated together and to a method of manufacturing the same.

BACKGROUND ART

One example of conventional battery assemblies is made up of cell units, each of which includes: a metal case that accommodates a power generating element; and a pair of front and rear frames that holds the case from its both sides in the thickness direction to cover the exterior of the case. In the conventional battery assembly, the plurality of cell units, each including a case and a pair of front and rear frames to hold the case, are arranged in the front and back direction, and side plates are disposed at both ends of the arrangement of the plurality of cell units. Then, a plurality of through-bolts are inserted from one of the side plates to pass through all the frames to the other side plate and are fastened by nuts at their protruding ends, so as to integrate the plurality of cell units to form the battery assembly (cf., Patent Document 1, for example).

As described above, Patent Document 1 discloses a battery assembly in which through-bolts are used to fasten the cell units together between the side plates at both ends. In addition to this, Patent Document 1 also discloses a technique for reducing the weight of a battery assembly by obviating the need for through-bolts or the like. This is accomplished by fixedly bonding the frames to the cases, under pressed conditions in the front and back direction, by the use of an adhesive, by heat welding or the like to thereby hold and fix the cases.

PRIOR ART DOCUMENT

Patent Document

Patent Document 1: Japanese Patent Application Laid-open No. 2004-281099

SUMMARY OF THE INVENTION

Problems to be Solved by the Invention

In a battery assembly including a plurality of cell units that are integrated together, it is necessary that frames and a case be in close contact with each other to prevent the case from being displaced within the frames when vibrations, shocks or the like occur. However, the separate-type frames with front and rear frames, as disclosed in the above Patent Document 1, are designed to allow for a dimensional tolerance so that the case can be accommodated in the frame without fail. As such, when forming a cell unit by accommodating the case in the frame, a small gap is left between the frames and the case. When integrating cell units, it is therefore necessary to eliminate a gap by applying high fastening force, in the process in which: a plurality of cell units are arranged and provided with side plates at the opposite ends; a plurality of through-bolts are inserted from one of the side plates at one end to pass through all the frames to the other side plate at the other end; and nuts are tightened onto the protruding ends of the bolts that pass through the frames. However, this is problematic because high fastening force can cause deformation and distortion of the frames. A further problem is that high strength bolts and side plates need to be used to increase fastening force and ensure sufficient bonding strength required between the frames, which results in increased weight of a battery assembly.

Also, in the case of the structure in which frames are fixedly bonded to a case, under pressed conditions in the front and back direction, by the use of an adhesive, by heat welding or the like, the battery assembly has a problem in that: when a plurality of the frames, each forming a gap with each of the cases, are arranged in the front and back direction and pressed, the gap causes distortion of the frames as with the above-described battery assembly, and the distorted frames cannot be joined (bonded or heat-welded) together in a satisfactory manner. This has made it impossible to manufacture a battery assembly that can withstand the actual use, leaving room for improvement.

The present invention, which has been made in view of the above situations, provides a battery assembly that is lightweight while ensuring sufficient bonding strength that is required between frames, as well as a method of manufacturing the same.

Means for Solving the Problems

In order to solve the above problems, the present invention provides a battery assembly including a plurality of cell units that are integrated together, each of the plurality of cell units including: a cell having a metal case; and a plastic frame that is integrally formed with an outer surface of the case, wherein the cell units are integrated together by having the frames of adjacent ones of the cell units joined together through surfaces thereof.

Furthermore, the present invention may provide a method of manufacturing a battery assembly formed by integrating a plurality of cell units together, the method including: forming a frame integrally with an outer surface of each of a plurality of metal cases, each of the metal cases accommodating a power generating element; aligning the plurality of cases to each other, each having the frame integrally formed thereon; and joining the frames of adjacent ones of the cases together through surfaces thereof.

As described above, the frame is integrally formed with an outer surface of the cell case, which provides close contact between the case and the frame without leaving a gap. Thus, this structure eliminates the gap formed by the conventional separate-type front and rear frames, and also obviates the need for through-bolts and side plates for ensuring high bonding strength. Accordingly, it is possible to provide a battery assembly that is lightweight while ensuring sufficient bonding strength that is required at the interface between the frames.

In order to solve the above problem, the present invention provides a battery assembly including a plurality of cell units that are integrated together, each of the plurality of cell units including: a cell having a metal case; and a plastic frame that holds the case without causing positional displacement of the case, wherein the cell units are integrated together by having adjacent frames joined together through surfaces thereof.

As described above, the frame holds the cell case without causing positional displacement. This structure eliminates the gap formed by the conventional separate-type front and rear frames, and also obviates the need for through-bolts and side plates for ensuring high bonding strength. Accordingly, it is possible to provide a battery assembly that is lightweight while ensuring sufficient bonding strength that is required at the interface between the frames.

In order to solve the above problems, the present invention provides a battery assembly including a plurality of cells that are integrated together, each of the plurality of cells including a metal case, the metal case having a plastic frame that is integrally formed with an outer surface of the case.

This structure also eliminates the need for through-bolts and side plates and thus can provide a battery assembly that is lightweight while ensuring sufficient bonding strength that is required at the interface between the frames.

In the battery assembly of the present invention, the frame may include ribs disposed on both side surfaces of the case in the thickness direction thereof.

When the frame includes ribs disposed on both side surfaces of the case in the thickness direction thereof, the ribs can prevent the decrease in strength while at the same time achieving weight reduction, as compared with an embodiment in which the frame extends on the entire side surfaces in the thickness direction of the case.

In the battery assembly of the present invention, a rib of the frame of one of the adjacent cell units and a rib of the frame of the other of the adjacent cell units may be positioned opposite to each other.

In this case, the two ribs of the adjacent frames can be brought into contact with each other, so as to prevent the expansion of the cell, which may be caused by heat, overcharging, decomposition of an electrolyte or the like.

In the battery assembly of the present invention, a clearance may be provided between a rib of the frame of one of the adjacent cell units and a rib of the frame of the other of the adjacent cell units.

In this case, the small clearance between the ribs allows ventilation therethrough in the vertical direction.

In the battery assembly of the present invention, the frame of one of the adjacent cell units may have a locking portion and the frame of the other of the adjacent cell units may have a to-be-locked portion.

In this case, positioning of the cell units relative to each other can be easily achieved.

In the battery assembly of the present invention, the case may have a rough surface to which the resin of the frame may cling, so as to allow the integration of the case and the frame. For example, the case may be subjected to surface roughening treatment, and the treated case may be placed in a mold into which a thermoplastic resin is injected to integrally form the frame on the outer surface of the case.

As described above, the case may be subjected to surface roughening treatment to have its surface roughened, and then placed in a mold into which a thermoplastic resin is injected to form the frame integrally on the outer surface of the case. This allows further enhancement of the bonding strength between the case and the resin because the resin clings to the outer surface of the case or because the contact area between the outer surface of the case and the resin is increased. For the roughness of the surface of the case, recesses and projections may preferably be formed to have a height difference of between 10 nm and 1000 nm. If the difference is less than 10 nm, the resin is less likely to cling to the rough surface of the case while a height difference of more than 1000 nm decreases the strength of the metal case.

Advantages of the Invention

In the battery assembly and the method of manufacturing the same according to the present invention, the frame is integrally formed with the outer surface of the cell case, which provides close contact between the case and the frame without leaving a gap. Thus, this structure eliminates the gap formed by the conventional separate-type front and rear frames, and also obviates the need for through-bolts and side plates for ensuring high bonding strength. Accordingly, it is possible to provide a battery assembly that is lightweight while ensuring sufficient bonding strength that is required at the interface between the frames, as well as a method of manufacturing the same.

BRIEF DESCRIPTION OF THE DRAWINGS

FIG. 2 is a perspective view of a battery assembly including two cell units that are joined together.

DETAILED DESCRIPTION OF THE PREFERRED EMBODIMENTS

An embodiment of the battery assembly according to the present invention is described below with reference to the accompanying drawings.

Figure 1:
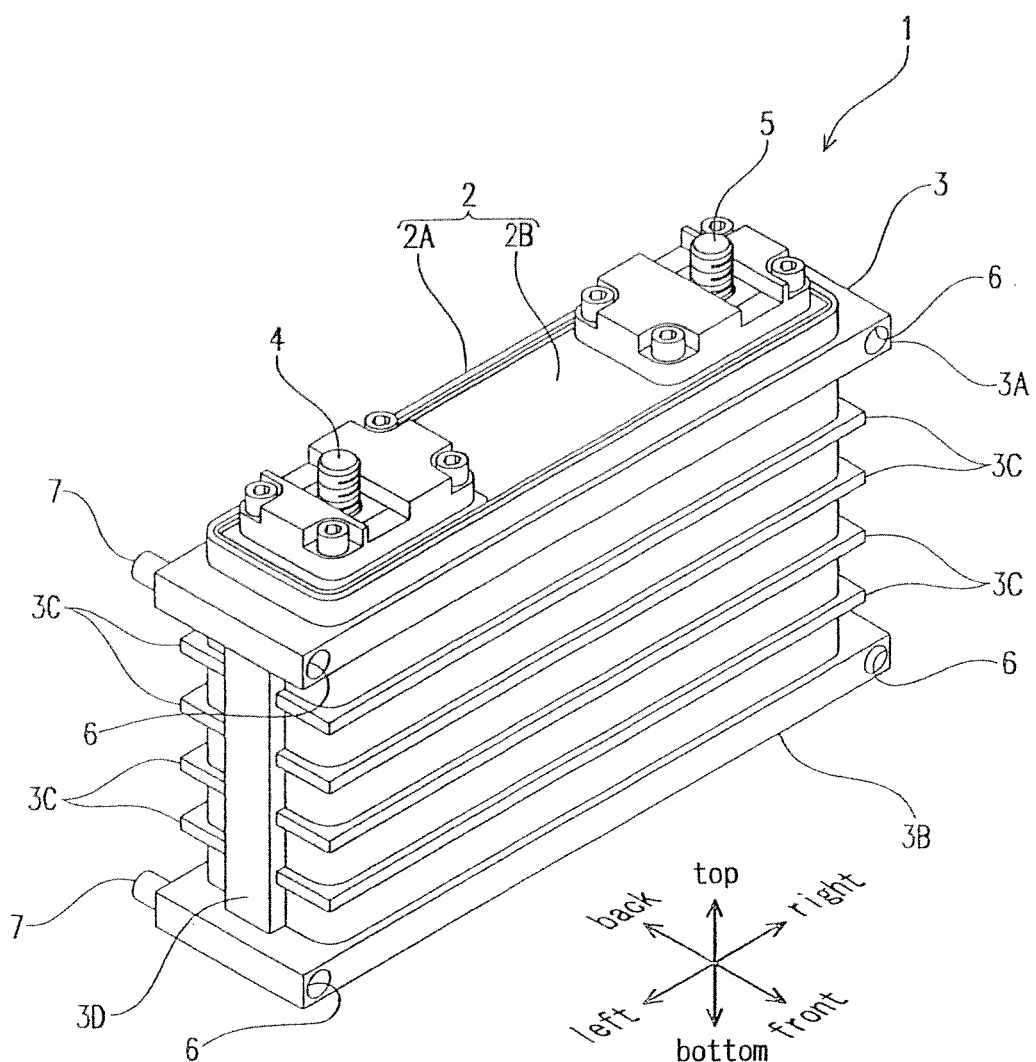
FIG. 1 is a perspective view illustrating an embodiment of a cell unit according to the present invention.

FIG. 1 illustrates a cell unit that constitutes a battery assembly of the present embodiment. The cell unit 1 includes a cell 2 and a plastic frame 3 that covers the exterior of the battery 2 serving as an insulator. The cell 2 is of the nickel metal hydride type. In the figures, the vertical direction, right and left direction and front and back direction are designated as shown for description below.

The cell 2 is configured to be open at the upper end, and includes a metal case 2A of a rectangular shape in plan view; a plate-shaped lid body 2B of a rectangular shape in plan view, provided to close the upper end opening of the case 2A; and a power generating element (not shown) accommodated in the case 2A.

The cell 2 has a cathode terminal 4 and an anode terminal 5, which project upward at both longitudinal ends of the lid body 2B and are each electrically connected to the power generating element in the case 2A.

The frame 3 is integrally formed with the outer surface of the metal case 2A. Specifically, the case 2A is subjected to surface roughening treatment to have its surface roughened. Then, the treated case is placed in a mold (not shown) into which a molten thermoplastic resin is injected to integrally form the frame 3 on the outer surface of the case 2A. The thus formed frame 3 is firmly integrated with the case 2A with the resin clinging to the rough surface formed on the exterior of the case.

The frame 3 has upper and lower ribs 3A, 3B. disposed on both side surfaces in the thickness direction of the case, at the upper end and the lower end, respectively, in such a manner that the ribs 3A, 3B protrude in the front and back direction and in the right and left direction to extend along the entire perimeter of the case. In addition, the frame 3 has a plurality of ribs 3C (four in this embodiment) spaced at certain intervals between the upper and lower ribs 3A, 3B in such a manner that the ribs 3C protrude entirely in the front and back direction and partially in the right and left direction to extend along the substantially entire perimeter of the case. The ribs 3A, 3B located at the upper and lower ends are thicker in the vertical direction than the four ribs 3C located between the ribs 3A, 3B. In addition, the ribs 3A, 3B protrude more in the front and back direction and in the right and left direction than the four ribs 3C. The frame also has vertical ribs 3D disposed on the right and left ends of the case at their centers in the front and back direction. The vertical ribs 3D, which protrude in the right and left direction, couple the ribs 3A, 3B. The four ribs 3C, at their right and left ends, are coupled to the vertical ribs 3D at their front and back ends.

Figure 3:
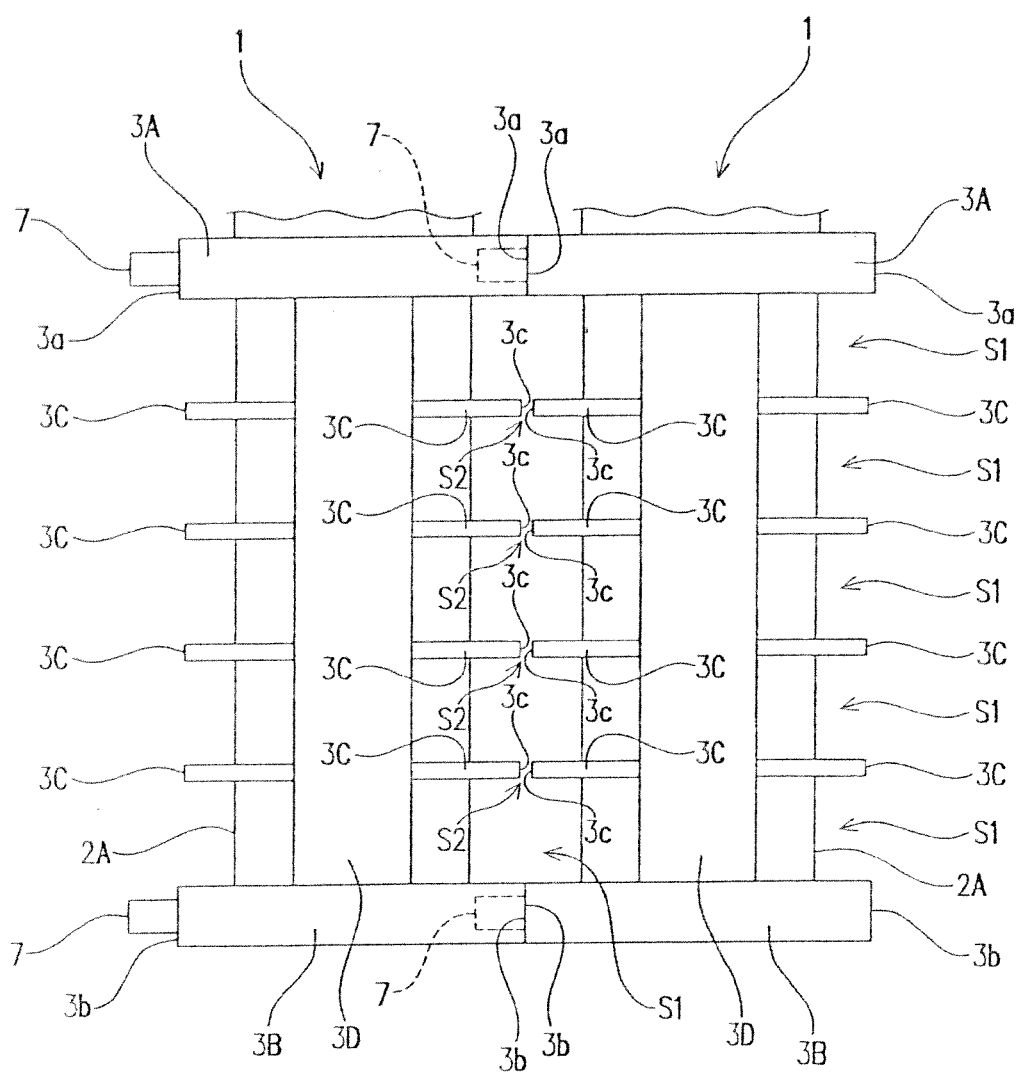
FIG. 3 is a side view of the battery assembly including two cell units that are joined together, with the upper portion thereof omitted.

As shown in FIG. 3, the ribs 3A, 3B, 3C are spaced vertically as described above, and this provides a plurality of horizontal clearances S1 for ventilation (five in this embodiment) between ribs that are adjacent to each other in the vertical direction, so that the case 2A can be cooled. Further, the ribs 3C, which are provided as intermediate ribs between the ribs 3A, 3B at the upper and lower ends of the frame 3, are configured to protrude less than the ribs at the upper and lower ends. This leaves small clearances S2 between surfaces 3c of the ribs 3C of a first frame 3 and surfaces 3c of the ribs 3C of a second frame 3 that face surfaces 3c of the ribs 3C of the first frame 3 in the thickness direction of the case 2A. These small clearances S2 allow ventilation therethrough in the vertical direction too. In this embodiment, ribs 3A, 3B, 3C extend in the horizontal direction, disposed at intervals in the vertical direction. Alternatively they may extend in the vertical direction to be disposed at intervals in the right and left direction, or they may extend diagonally to be disposed diagonally at intervals. That is, the ribs 3A, 3B, 3C may be configured to extend in any direction. In addition, rather than having a plurality of the ribs 3A, 3B, 3C, the frame 3 may have a single rib.

A further advantage is afforded by having the ribs 3C of the first frame 3 and the ribs 3C of the second frame 3 positioned to face each other. With this, the ribs 3C of the first and second frames 3 may be brought into contact with each other to prevent expansion of the cell 2 even when it is likely to occur due to heat or overcharging, decomposition of an electrolyte or the like. In the figures, the clearances S2 are shown as being large for the sake of clarity, but they are actually very small. Alternatively, the protrusion of the ribs 3C may be adjusted so that no clearance S2 is left. In this case, the protrusion of the ribs 3C is adjusted so that the four ribs 3C and the four ribs 3C of the respective adjacent first and second frames 3, 3 come into contact with each other, at the same time as the upper and lower end ribs 3A, 3B and 3A, 3B of the adjacent frames 3, 3 come into contact with each other, or after the upper and lower end ribs 3A, 3B and 3A, 3B of the adjacent frames 3, 3 come into contact with each other.

As described above, the integral formation of the frame 3 on the surface of the case 2A leaves no gap between the case 2A and the frame 3. This eliminates the need for application of high force to the frame 3 as is conventionally done to eliminate the gap between the case and the frame, when adjacent frames 3, 3 are joined together. This results in no distortion caused by deformation of the frame 3, thereby preventing a decrease in dimensional accuracy (more specifically, flatness of the joined surfaces of the frames 3). As a result, it is possible to sufficiently ensure a necessary bonding strength between the cell units 1, 1 when they are integrated, with the surfaces of the frames 3, 3, which are adjacent in the thickness direction of the case, being melt-bonded to each other. As the resin to be melted, polyethylene terephthalate (PET), polypropylene (PP), polyphenylene sulfide (PPS), or the like may be used.

Thus, the joining surfaces 3a, 3a and 3b, 3b of the upper and lower end ribs 3A, 3B and 3A, 3B of the adjacent frames 3, 3 can be joined to each other without leaving gaps. In the joined state, the ribs 3A, 3A and the ribs 3B, 3B are each heat welded (or ultrasonically welded) together so as to firmly integrate the frames 3, 3. For the joining of the frames 3, 3, heat-welding may be employed as well as the use of an adhesive. As a supplementary measure to integrate the frames 3, 3 more firmly, a thin bolt may be inserted to pass through the frames 3, 3 and a nut may be threadedly tightened onto the end of the bolt that passes through the frames 3, 3. Since there is no gap between the case 2A and the frame 3 as described above, fastening with the bolt does not cause distortion of the adjacent frames 3, 3, but rather it further enhances the bonding strength with the fastening force applied to the frames.

The frame 3 has holes 6 serving as to-be-locked portions on the first end surface (the front end surface in FIG. 1) in the front and back direction thereof (on the four corners, in this embodiment), and has cylindrical projections 7 serving as locking portions which project from the second end surface (the back end surface in FIG. 1). Thus, positioning of the cell units in the vertical direction and in the right and left direction is completed in such a manner that the projections 7 of the second frame 3 located adjacent in the front and back direction are lockingly engaged with the holes 6 of the first frame 3 in the front and back direction.

A method of manufacturing a battery assembly formed by integrating a plurality of cell units is briefly described here. First, as described above, the case 2A subjected to surface roughening treatment is placed in a mold (not shown), into which a thermoplastic resin, melted at high temperature, is injected to form the frame 3 integrally with the case 2A on the outer surface thereof. After the frame 3 is integrally formed with the case 2A, a power generating element is placed in the case 2A, and then the lid body 2B is attached to the upper end of the case 2A to close the upper end of the case 2A, so that the cell unit 1 is fabricated. Then, the fabricated cell units 1 are individually inspected to check the performance of the cells 2. A plurality of selected good quality cell units 1 are arranged in the front and back direction as shown in FIG. 2. When this arrangement is made, as described above, the projections 7 of the second frame 3 located adjacent in the front and back direction are lockingly engaged with the holes 6 of the first frame 3 in the front and back direction. In this manner, positioning of adjacent cell units 1, 1 in the vertical direction and in the right and left direction is completed. Subsequently, the frames 3, 3 of the adjacent cell units 1, 1 are joined together through their surfaces. Specifically, as described above, the joined upper ribs 3A, 3A and the joined lower ribs 3B, 3B are each heat welded (or ultrasonically welded) together to firmly integrate the frames 3, 3. In this manner, the manufacture of the battery assembly is completed. In the case where no ribs 3A, 3B, and 3C are provided, the frames 3, 3 have flat surfaces and are joined together through their flat surfaces. The power generating element may be placed in the case 2A after the integral formation of the frame 3 with the case 2A. Alternatively, the power generating element may be placed in the case 2A after the joining of the adjacent cell units 1, 1 through the surfaces of the frames 3, 3, and then a lid body 2B may be attached to the upper end of he case 2A.

It is to be noted that the present invention is not limited to the above described embodiments, and various modifications may be made without departing from the spirit and scope of the invention.

In the above embodiment, two cell units 1, 1 are joined together to form a battery assembly, but alternatively three or more cell units may be joined together to form a battery assembly. The shape of the cell unit may be rectangular or square in plan view.

In the above embodiment, each cell unit 1 is made up of a cell 2 and a frame 3, and the integration of the plurality of cell units 1 is accomplished by joining together the surfaces of the frames 3, 3 of the adjacent cell units 1, 1. Alternatively, the frame may not be provided for each cell, but instead the plurality of cells 2 may have a plastic frame that is integrally formed with the outer surfaces of the cases 2A thereof so that the frame may retain the plurality of cells. To briefly describe the method of manufacturing this battery assembly, a plurality of the surface-roughened cases 2A are placed within a mold (not shown) with the cases spaced apart from each other, into which a thermoplastic resin, melted at high temperature, is injected to integrally form the frame on the outer surfaces of the cases 2A. A power generating element is placed in each of the cases 2A, and then the lid body 2B is attached to the upper end of each of the cases 2A to close it. In this manner, the battery assembly is fabricated. As described, the power generating element may be placed in the case 2A after the integration of the frame with the case 2A, but alternatively each of the cells 1 may be completed first, which then may be placed within the mold for the formation of the frame with the cases spaced apart from each other.

In the above embodiment, a nickel metal hydride battery is illustrated, but a lithium-ion battery or the like may be employed. In other words, any type of battery may be employed as long as it includes a cell and a frame.

Furthermore, a set of the two cell units 1, 1 may include side plates at opposite ends thereof to hold and fix the cell units from opposite sides.

Furthermore, in the above embodiment, each cell unit 1 includes four holes 6 serving as to-be-locked portions at the first end surface of the frame 3 and four projections 7 at the second end surface. With this structure, any number of cell units 1 may be joined together. Alternatively, the battery assembly may be composed of only two cell units 1, 1 that are locked together, with one of the two cell units 1, 1 having four holes 6 at the first end surface of the frame 3 thereof and the other of the cell units 1, 1 having four projections 7 at the second end surface of the frame 3 thereof. The numbers of the to-be-locked portions and the locking portions and the specific structures thereof may be freely changed. Alternatively, the present invention may be implemented without to-be-locked portions or locking portions.

DESCRIPTION OF REFERENCE CODES

1: cell unit, 2: cell, 2A: case, 2B: lid body, 3: frame, 3A, 3B, 3C: rib, 3D: vertical rib, 3a, 3b: joining surface, 3c: surface, 4: cathode terminal, 5: anode terminal, 6: hole (to-be-locked portion), 7: projection (locking portion), S1, S2: clearance

The invention claimed is:

1. A battery assembly comprising a plurality of cell units that are integrated together, each of the plurality of cell units comprising:
   a cell including a metal case; and
   a plastic frame that is integrally formed with an outer surface of the case,
   wherein the metal case comprises:
     a first metal wall;
     a second metal wall positioned opposite to the first metal wall; and
     a metal portion joining ends of the first metal wall and the second metal wall,
   wherein the cell units are integrated together by having the frames of adjacent ones of the cell units joined together through surfaces thereof,
   wherein the frame includes ribs disposed on each of both side surfaces of the metal case in a thickness direction thereof,
   wherein the ribs include:
     a pair of upper and lower end ribs located respectively at upper and lower ends of said each of both side surfaces of the metal case in the thickness direction thereof; and
     at least one intermediate rib located between the pair of upper and lower end ribs,
   wherein the pair of upper and lower end ribs of the frame of one of the adjacent cell units and the pair of upper and lower end ribs of the frame of another of the adjacent cell units are positioned opposite to each other and are held in contact with each other, and
   wherein a clearance is provided between the at least one intermediate rib of the frame of said one of the adjacent cell units and the at least one intermediate rib of the frame of said another of the adjacent cell units.

2. The battery assembly according to claim 1, wherein one of the ribs of the frame of said one of the adjacent cell units and another one of the ribs of the frame of said another of the adjacent cell units are positioned opposite to each other.

3. The battery assembly according to claim 1, wherein the frame of said one of the adjacent cell units includes a locking portion and the frame of said another of the adjacent cell units includes a to-be-locked portion.

4. The battery assembly according to claim 1, wherein the metal case includes a rough surface to which a resin of the frame clings, so as to allow an integration of the metal case and the frame.

5. The battery assembly according to claim 4, wherein the rough surface of the metal case includes recesses and projections that have a height difference of between 10 nm and 1000 nm.

6. A method of manufacturing a battery assembly formed by integrating a plurality of cell units together, the method comprising:
   forming a plastic frame integrally with an outer surface of each of a plurality of metal cases, each of the metal cases accommodating a power generating element;
   aligning the plurality of metal cases to each other, each having the frame integrally formed thereon; and
   joining the frames of adjacent ones of the cases together through surfaces thereof,
   wherein said each of the plurality of the metal cases comprises:
     a first metal wall;
     a second metal wall positioned opposite to the first metal wall; and
     a metal portion joining ends of the first metal wall and the second metal wall,
   wherein the frame includes ribs disposed on each of both side surfaces of said each of the plurality of the metal cases in a thickness direction thereof,
   wherein the ribs include:
     a pair of upper and lower end ribs located respectively at upper and lower ends of said each of both side surfaces of said each of the plurality of the metal cases in the thickness direction thereof; and
     at least one intermediate rib located between the pair of upper and lower end ribs,
   wherein the pair of upper and lower end ribs of the frame of one of the adjacent cell units and the pair of upper and lower end ribs of the frame of another of the adjacent cell units are positioned opposite to each other and are held in contact with each other, and
   wherein a clearance is provided between the at least one intermediate rib of the frame of said one of the adjacent cell units and the at least one intermediate rib of the frame of said another of the adjacent cell units.

7. The battery assembly according to claim 1, wherein the pair of upper and lower end ribs are each greater in width than the at least one intermediate rib.

8. The battery assembly according to claim 1, wherein the at least one intermediate rib of the frame of the one of the adjacent cell units and the at least one intermediate rib of the frame of the another of the adjacent cell units are positioned opposite to each other.

9. The battery assembly according to claim 8, wherein the at least one intermediate rib protrudes less in a thickness direction of the metal case than each of the pair of the upper and lower end ribs.

10. The battery assembly according to claim 1, wherein the at least one intermediate rib comprises a plurality of intermediate ribs spaced at certain intervals between the pair of upper and lower end ribs.

11. The battery assembly according to claim 1, wherein the frame of said one of the adjacent cell units includes locking portions at the pair of upper and lower end ribs thereof and the frame of the another of the adjacent cell units includes to-be-locked portions at the pair of upper and lower end ribs thereof 12. The method of manufacturing a battery assembly according to claim 6, wherein said each of the plurality of the metal cases is subjected to a surface roughening treatment, the treated case is placed in a mold, and a thermoplastic resin is injected into the mold to integrally form the frame with the outer surface of said each of the plurality of the metal cases.

13. The battery assembly according to claim 1, wherein the plastic frames are bonded together by an adhesive, a heat welding, or an ultrasonic welding.

14. The method of manufacturing a battery assembly according to claim 6, wherein the plastic frames are bonded together by an adhesive, a heat welding, or an ultrasonic welding.

15. The method of manufacturing a battery assembly according to claim 6, wherein said joining the frames comprises bonding together the plastic frames by one of an adhesive, a heat welding, and an ultrasonic welding.

* * * * *